US012027752B2

(12) United States Patent
Chen et al.

(10) Patent No.: US 12,027,752 B2
(45) Date of Patent: Jul. 2, 2024

(54) ELECTRONIC DEVICE

(71) Applicants: Jhih-Ciang Chen, Taipei (TW); Shih-Chia Liu, Taipei (TW); Yen-Hao Yu, Taipei (TW); Li-Chun Lee, Taipei (TW); Chih-Heng Lin, Taipei (TW); Je-Wei Liao, Taipei (TW); Chun-Cheng Chan, Taipei (TW); Jui-Hung Lai, Taipei (TW)

(72) Inventors: Jhih-Ciang Chen, Taipei (TW); Shih-Chia Liu, Taipei (TW); Yen-Hao Yu, Taipei (TW); Li-Chun Lee, Taipei (TW); Chih-Heng Lin, Taipei (TW); Je-Wei Liao, Taipei (TW); Chun-Cheng Chan, Taipei (TW); Jui-Hung Lai, Taipei (TW)

(73) Assignee: COMPAL ELECTRONICS, INC., Taipei (TW)

( * ) Notice: Subject to any disclaimer, the term of this patent is extended or adjusted under 35 U.S.C. 154(b) by 366 days.

(21) Appl. No.: 17/506,687

(22) Filed: Oct. 21, 2021

(65) Prior Publication Data

US 2022/0223996 A1 Jul. 14, 2022

Related U.S. Application Data

(60) Provisional application No. 63/137,121, filed on Jan. 13, 2021.

(51) Int. Cl.
*H01Q 1/22* (2006.01)
*H01Q 1/38* (2006.01)
*H01Q 13/18* (2006.01)

(52) U.S. Cl.
CPC ............. *H01Q 1/2266* (2013.01); *H01Q 1/38* (2013.01); *H01Q 13/18* (2013.01)

(58) Field of Classification Search
CPC ........ H01Q 1/2266; H01Q 1/38; H01Q 13/18; H01Q 9/42; H01Q 1/24
See application file for complete search history.

(56) References Cited

U.S. PATENT DOCUMENTS 4,242,685 A * 12/1980 Sanford ................ H01Q 13/18 343/770
11,676,907 B2 * 6/2023 Lee ......................... H01L 23/13 257/668

(Continued)

FOREIGN PATENT DOCUMENTS

TW 201530901 8/2015
TW 201933678 8/2019

OTHER PUBLICATIONS

"Office Action of Taiwan Counterpart Application", issued on Nov. 16, 2022, p. 1-p .7.

*Primary Examiner* — David E Lotter
(74) *Attorney, Agent, or Firm* — JCIPRNET

(57) ABSTRACT

An electronic device including a first body, a second body, and at least one cavity antenna module is provided. The second body has a pivot side and a plurality of non-pivot sides, and the pivot side is connected pivotally to the first body. The cavity antenna module includes a metal cavity body and a first antenna structure. The metal cavity body is disposed in the second body and has an opening. A distance between one of the non-pivot sides and the metal cavity body is smaller than a distance between the pivot side and the metal cavity body, and the opening faces the one of the non-pivot sides. The first antenna structure is disposed in the opening of the metal cavity body, and the first antenna structure includes a feeding portion, a radiating portion, and a ground portion connected with one another.

9 Claims, 10 Drawing Sheets

(56) References Cited

U.S. PATENT DOCUMENTS

| | | | | |
|---|---|---|---|---|
| 2010/0231481 | A1* | 9/2010 | Chiang | H01Q 9/42 343/702 |
| 2011/0006953 | A1* | 1/2011 | Chiang | H01Q 1/2266 343/702 |
| 2017/0084554 | A1* | 3/2017 | Dogiamis | H01L 23/49838 |
| 2018/0182691 | A1* | 6/2018 | Cho | H01L 24/20 |
| 2021/0175608 | A1* | 6/2021 | Ramasamy | H01Q 1/2266 |
| 2022/0393337 | A1* | 12/2022 | Liu | H01Q 19/10 |
| 2023/0246343 | A1* | 8/2023 | Tian | H01Q 1/2266 343/702 |

* cited by examiner

ELECTRONIC DEVICE

CROSS-REFERENCE TO RELATED APPLICATION

This application claims the priority benefit of U.S. provisional application Ser. No. 63/137,121, filed on Jan. 13, 2021. The entirety of the above-mentioned patent application is hereby incorporated by reference herein and made a part of this specification.

BACKGROUND

Technical Field

The disclosure relates to an electronic device, particularly to an electronic device having an antenna.

Description of Related Art

For a notebook computer whose casing is made of metal material, it is necessary to provide an antenna clearance area in the metal casing when arranging an antenna inside the metal casing of the notebook computer. The antenna clearance area is usually made of plastic materials embedded in the metal casing, and its position corresponds to the location of the antenna to prevent the metal casing from interfering the antenna's signal transmission and reception. However, this design also prevents the casing of the notebook computer from having a complete, streamline metallic appearance, and it also complicates the manufacturing process of the casing.

SUMMARY

The present disclosure provides an electronic device with a simple casing design for the antenna module to have a good ability for receiving and transmitting signals.

The electronic device of the present disclosure includes a first body, a second body, and at least one cavity antenna module. The second body has a pivot side and a plurality of non-pivot sides, and the pivot side is connected pivotally to the first body. The cavity antenna module includes a metal cavity body and a first antenna structure. The metal cavity body is disposed in the second body and has an opening. The distance between one of the non-pivot sides and the metal cavity body is smaller than the distance between the pivot side and the metal cavity body, and the opening faces the one of the non-pivot sides. The first antenna structure is disposed in the opening of the metal cavity body. The first antenna structure includes a feeding portion, a radiating portion, and a ground portion connected with one another.

In an embodiment of the present disclosure, the cavity antenna module includes an insulating substrate. The insulating substrate is embedded in the opening, and the first antenna structure is disposed on the insulating substrate.

In an embodiment of the present disclosure, the second body includes a metal casing, and the metal cavity body is disposed in the metal casing.

In an embodiment of the present disclosure, the metal casing includes a top wall and a side wall that are connected to each other. The metal cavity body corresponds to a non-edge portion of the top wall. An edge portion of the top wall is connected between the side wall and the non-edge portion. The metal casing has a slot, and the slot is formed on the side wall or the edge portion of the top wall.

In an embodiment of the present disclosure, two sections of the opening respectively face two adjacent ones of the non-pivot sides, and two sections of the slot are respectively located on the two ones of the non-pivot sides and respectively correspond to the two sections of the opening.

In an embodiment of the present disclosure, the electronic device includes at least one conductive bonding layer, where the metal cavity body is connected to the metal casing through the conductive bonding layer.

In an embodiment of the present disclosure, the metal cavity body is at least partially constituted by the metal casing.

In an embodiment of the present disclosure, the metal casing includes a top wall and a bottom wall opposed to each other. The metal cavity body includes at least one wall, and the at least one wall is connected between the top wall and the bottom wall.

In an embodiment of the present disclosure, the cavity antenna module includes two cavity antenna modules, and a distance exists between the two cavity antenna modules.

In an embodiment of the present disclosure, the distance is greater than or equal to 5 mm.

In an embodiment of the present disclosure, the electronic device includes a touch pad, where the second body includes a casing, the casing includes a top wall and a bottom wall opposed to each other, the touch pad is disposed on the top wall, and the metal cavity body is located between the touchpad and the bottom wall.

In an embodiment of the present disclosure, the cavity antenna module includes a second antenna structure, and the second antenna structure is disposed in the opening and coplanar with the first antenna structure.

Based on the above, in the present disclosure, a cavity antenna module is disposed in the second body, where the opening of the metal cavity body faces a non-pivot side of the second body, so that the first antenna structure located in the opening is able to send and receive signals through the non-pivot side. Therefore, in the case where a casing of the second body is made of metal, it only needs to form a slot corresponding to the first antenna structure on the non-pivot side of the second body to operate the first antenna structure's signal transmission and reception and don't be interfered by the metal casing. Hence, the present disclosure provides a simple casing design for the cavity antenna module to have a good ability for receiving and transmitting signals without the need to provide a large antenna clearance area in the metal casing as in the conventional design.

DESCRIPTION OF THE EMBODIMENTS

Figure 1:
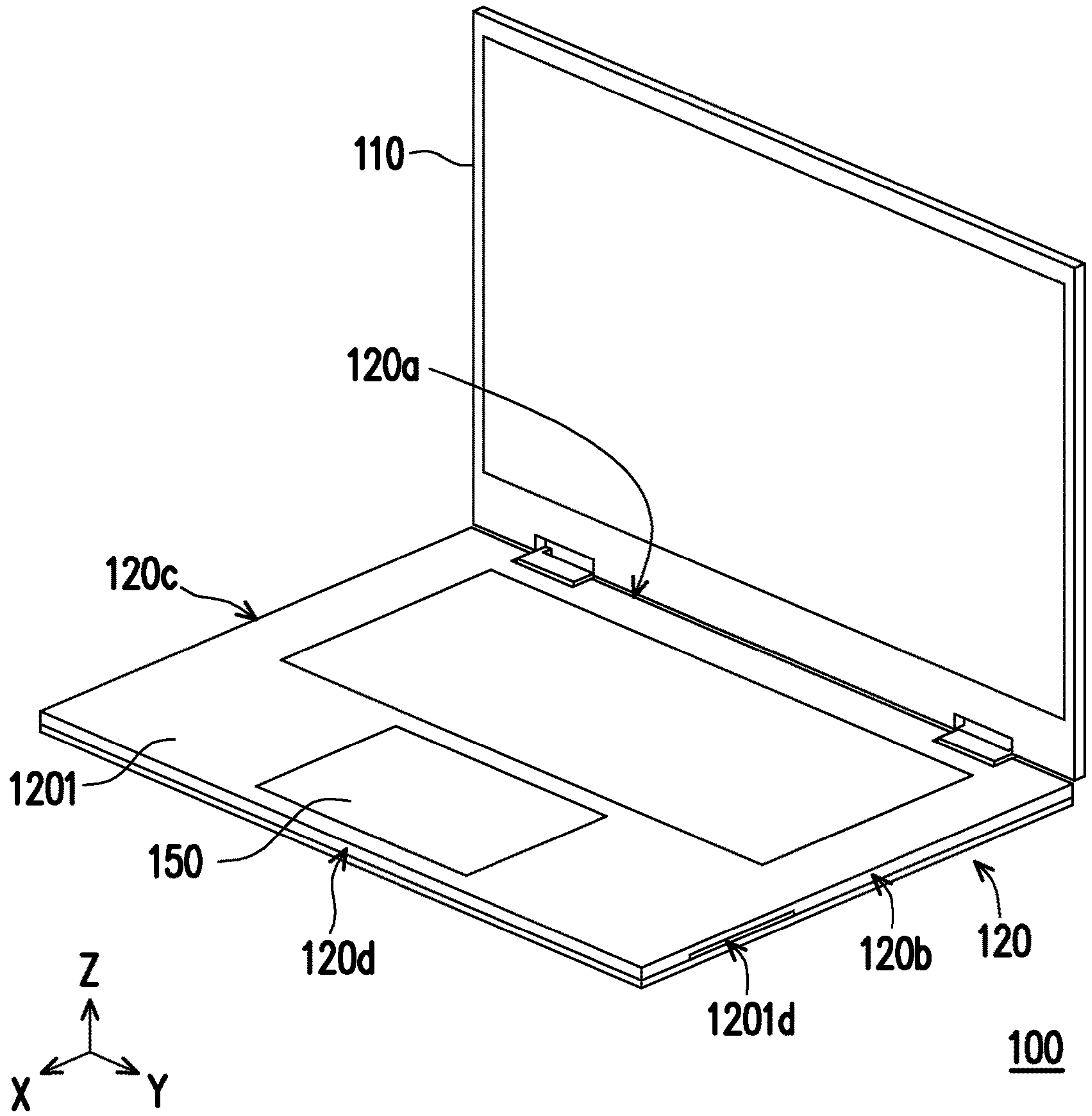
FIG. 1 is a perspective view of an electronic device according to an embodiment of the disclosure.
Figure 2:
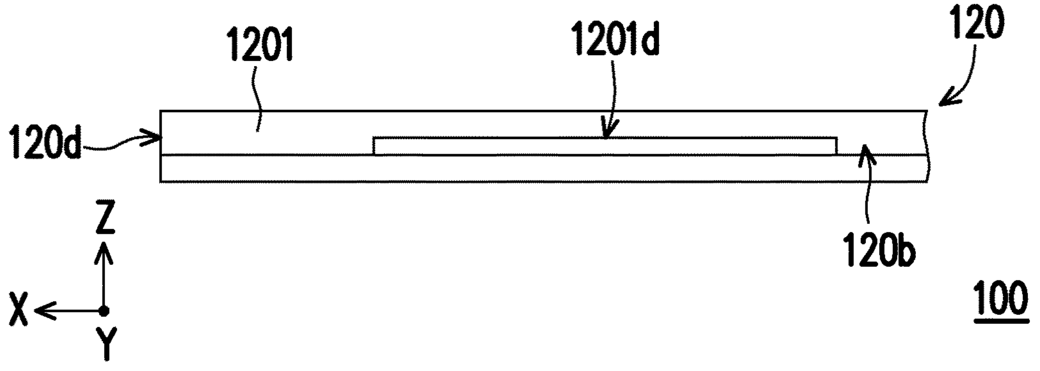
FIG. 2 is a side view of the second body of FIG. 1.
Figure 3:
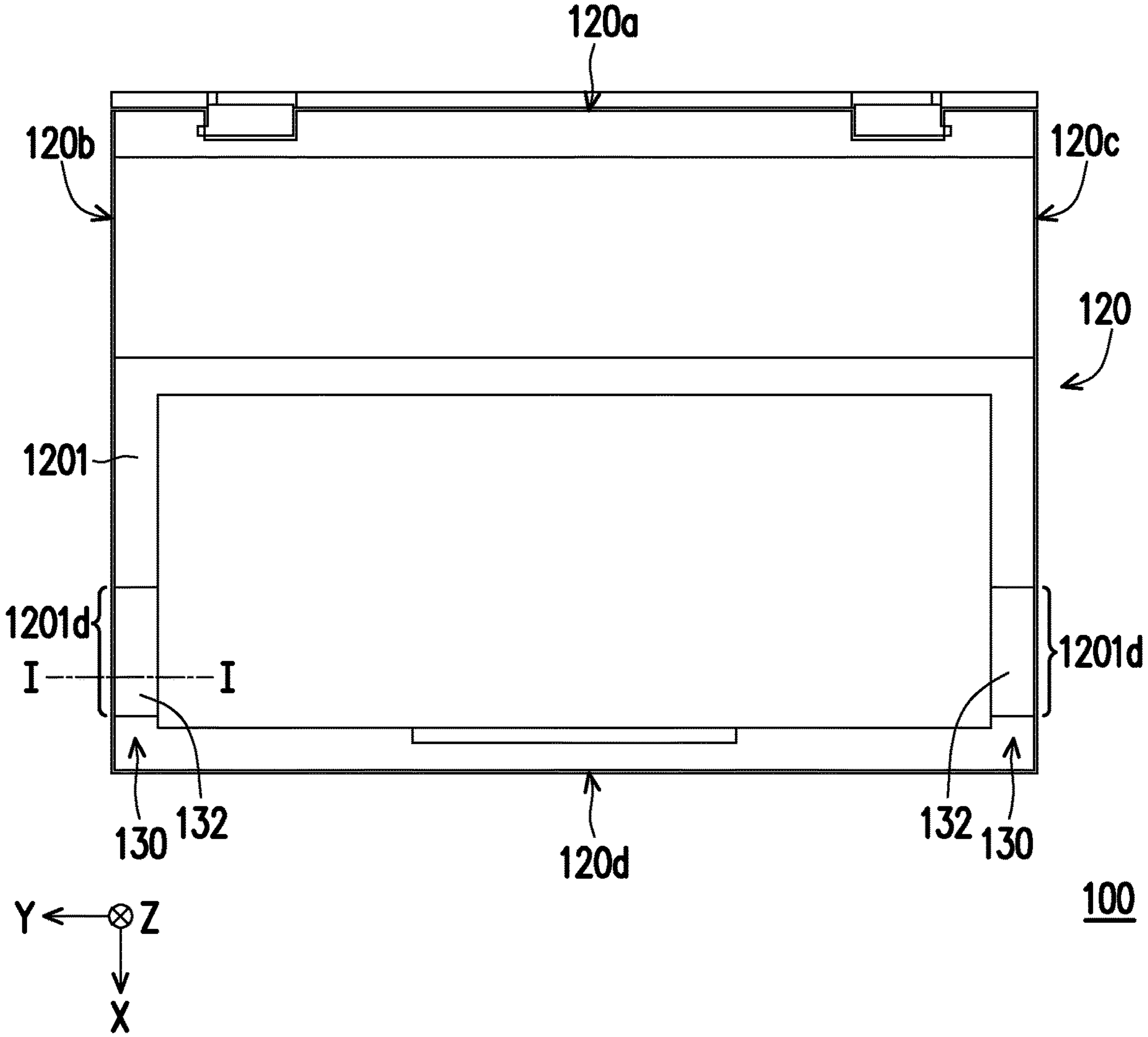
FIG. 3 is a bottom view of the electronic device of FIG. 1.

FIG. 1 is a perspective view of an electronic device according to an embodiment of the disclosure. FIG. 2 is a side view of the second body of FIG. 1. FIG. 3 is a bottom view of the electronic device of FIG. 1. In FIG. 1 to FIG. 3, an electronic device 100 of this embodiment is, for example, a notebook computer and it includes a first body 110, a second body 120, and at least one cavity antenna module 130 (two are shown in FIG. 3). The first body 110 is, for example, a screen of a notebook computer. The second body 120 is, for example, a host of a notebook computer and has a pivot side **120*a* and a plurality of non-pivot sides 120*b*, 120*c*, and 120*d*. The pivot side 120*a* is connected pivotally to the first body 110. The second body 120 includes a metal casing 1201, and the metal casing 1201 has slots 1201*d* respectively at the non-pivot sides 120*b* and 120*c*. The two cavity antenna modules 130 are disposed in the second body 120 and respectively correspond to the slots 1201*d* at the non-pivot sides 120*b* and 120*c***.

Figure 4:
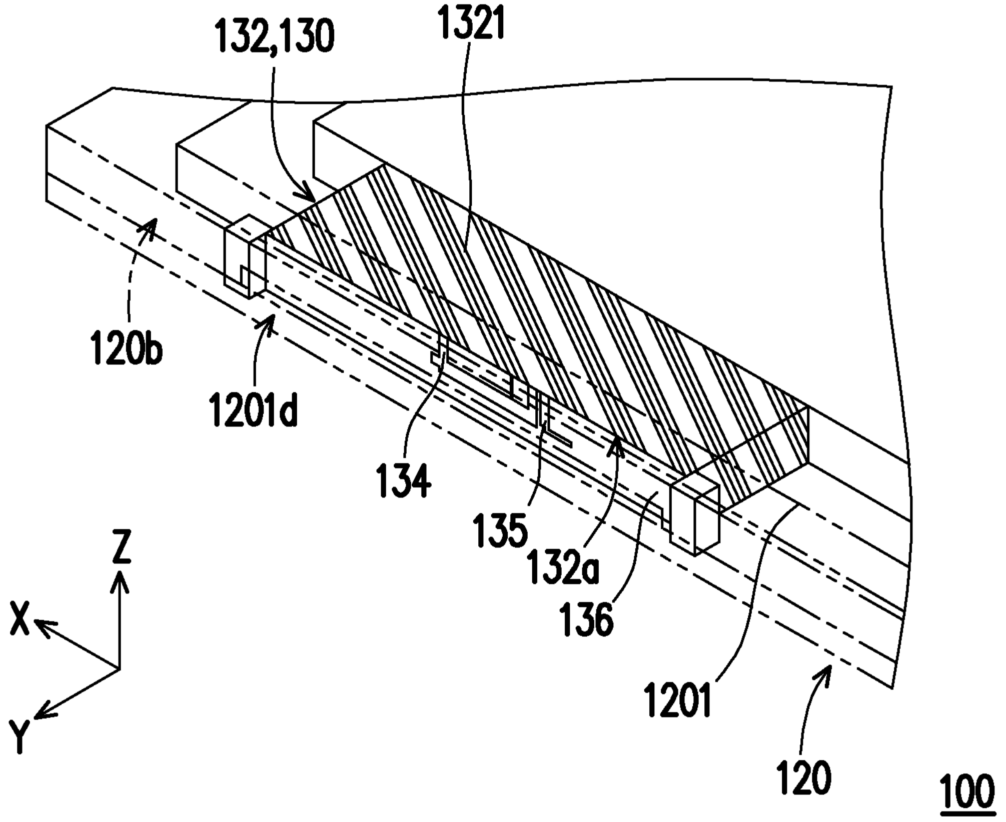
FIG. 4 is a partial perspective view of the electronic device of FIG. 1.
Figure 5:
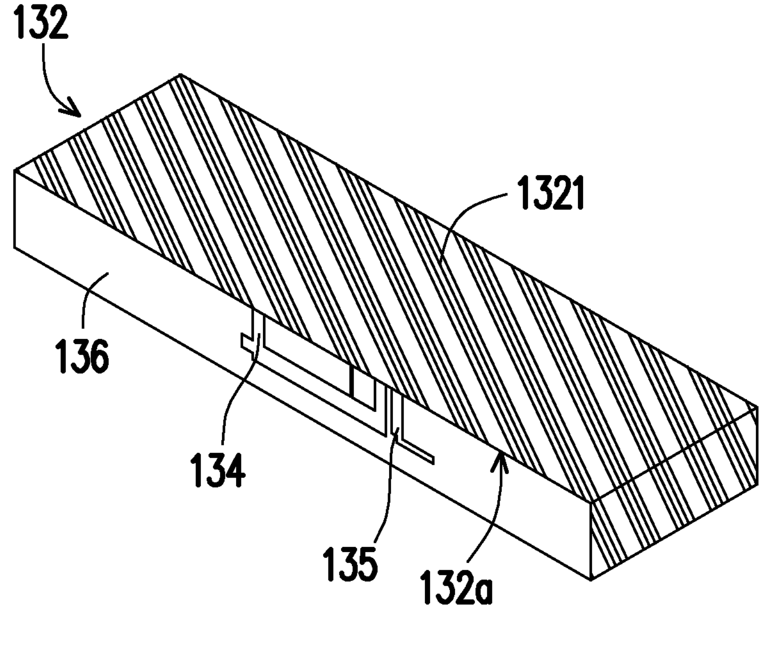
FIG. 5 is a perspective view of the cavity antenna module of FIG. 4.
Figure 6:
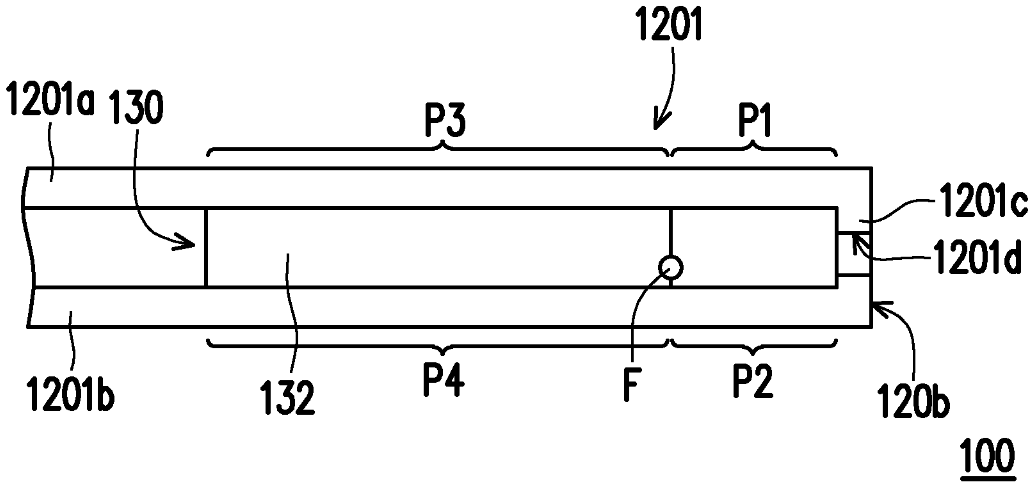
FIG. 6 is a schematic cross-sectional view of the electronic device of FIG. 3 along line I-I.

FIG. 4 is a partial perspective view of the electronic device of FIG. 1. FIG. 5 is a perspective view of the cavity antenna module of FIG. 4. FIG. 6 is a schematic cross-sectional view of the electronic device of FIG. 3 along line I-I. In FIG. 4 to FIG. 6, the cavity antenna module 130 of this embodiment includes a metal cavity body 132, a first antenna structure 134, and an insulating substrate 136. The metal cavity body 132 is disposed in the metal casing 1201 of the second body 120. The metal cavity body 132 is, for example, a rectangular parallelepiped structure formed by a plurality of metal walls 1321 surrounding the inner cavity, and has an opening **132*a*. In other words, the five surfaces of the rectangular parallelepiped structure are all metal walls 1321, and the last surface is the open end formed by the opening 132*a*. The insulating substrate 136 is embedded in the opening 132*a*, and the first antenna structure 134 is disposed on the insulating substrate 136 and located in the opening 132*a*. The opening 132*a* of each metal cavity body 132 faces the corresponding non-pivot side 120*b*/120*c***.

As shown in FIG. 3, the distance between the non-pivot side **120*b* and the corresponding metal cavity body 132 is smaller than the distance between the pivot side 120*a* and the metal cavity body 132, and the distance between the non-pivot side 120*c* and the corresponding metal cavity body 132 is smaller than the distance between the pivot side 120*a* and the metal cavity body 132. In other words, each metal cavity body 132 is disposed closer to the corresponding non-pivot side 120*b*/120*c* and is farther away from the pivot side 120*a***.

Figure 7:
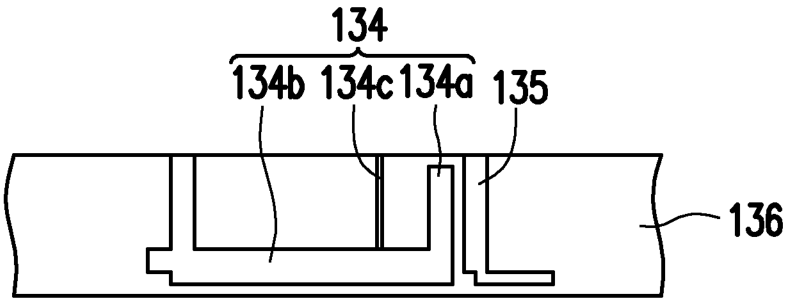
FIG. 7 shows the first antenna structure of FIG. 5.

FIG. 7 shows the first antenna structure of FIG. 5. In FIG. 7, the first antenna structure 134 of this embodiment includes a feeding portion **134*a*, a radiating portion 134*b*, and a ground portion 134*c* connected with one another to form a loop antenna. The feeding portion 134*a* corresponds to a feeding point F shown in FIG. 6. The first antenna structure 134** may be in the form of a planar inverted-F antenna (PIFA) or a loop antenna, which is not limited in the present disclosure.

As described above, in this embodiment, the cavity antenna module 130 is configured in the second body 120, and the opening **132*a* of the metal cavity body 132 faces the non-pivot side 120*b*/120*c* of the second body 120, which enables the loop-like first antenna structure 134 in the opening 132*a* to transmit and receive signals through the non-pivot side 120*b*/120*c*. Thus, in the case where the second body 120 includes the metal casing 1201, it only needs to form a slot 1201*d* corresponding to the first antenna structure 134 on the non-pivot side 120*b*/120*c* of the second body 12 to operate the signal transmission and reception of the first antenna structure 134 and don't be interfered by the metal casing 1201. Therefore, in this embodiment, it is not necessary to provide a large antenna clearance area in the metal casing as in the conventional design for the cavity antenna module 130** inside to have a good ability for receiving and transmitting signals through the simple casing design.

In FIG. 1 to FIG. 4, in this embodiment, the length of the slot **1201*d* in an X direction is, for example, greater than the length of the metal cavity body 132 in the X direction, and the width of the slot 1201*d* in a Z direction is, for example, greater than 2 mm, so that the cavity antenna module 130 is capable of transmitting and receiving signals through the slot 1201*d*** with a good antenna efficiency.

Figure 8:
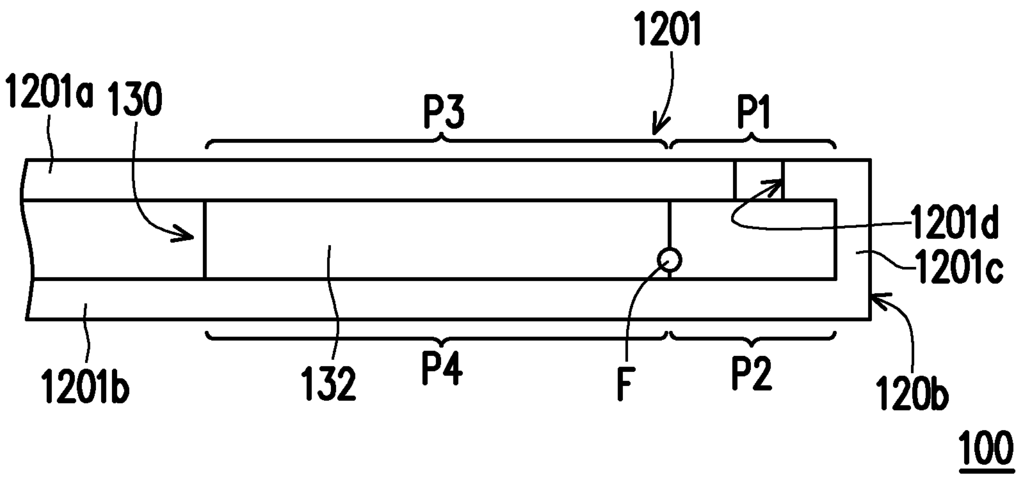
FIG. 8 is a schematic cross-sectional view of an electronic device according to another embodiment of the disclosure.

More specifically, in FIG. 6, the metal casing 1201 of this embodiment includes a top wall **1201*a*, a bottom wall 1201*b*, and a side wall 1201*c* that are connected to one another. The top wall 1201*a* and the bottom wall 1201*b* are opposed to each other, and the side wall 1201*c* is connected between the top wall 1201*a* and the bottom wall 1201*b*. The metal cavity body 132 corresponds to a non-edge portion P3 of the top wall 1201*a* and a non-edge portion P4 of the bottom wall 1201*b*. An edge portion P1 of the top wall 1201*a* is connected between the side wall 1201*c* and the non-edge portion P3. An edge portion P2 of the bottom wall 1201*b* is connected between the side wall 1201*c* and the non-edge portion P4. The side wall 1201*c*, the edge portion P1 of the top wall 1201*a*, and the edge portion P2 of the bottom wall 1201*b* constitute one of the non-pivot sides 120*b*, 120*c*, and 120*d* of the second body 120 (FIG. 6 shows the non-pivot side 120*b*). The slot 1201*d* of the metal casing 1201 may be formed in the side wall 1201*c* as shown in FIG. 6. The slot 1201*d* of the metal casing 1201 may also be formed on the edge portion P1 of the top wall 1201*a* as shown in FIG. 8**, to which the present disclosure is not limited.

In FIG. 7, in this embodiment, the cavity antenna module 130 may further include a second antenna structure 135. The second antenna structure 135 is disposed on the insulating substrate 136 in the opening **132*a* and is coplanar with the first antenna structure 134 to act as a parasitic element beside the first antenna structure 134**.

Figure 9:
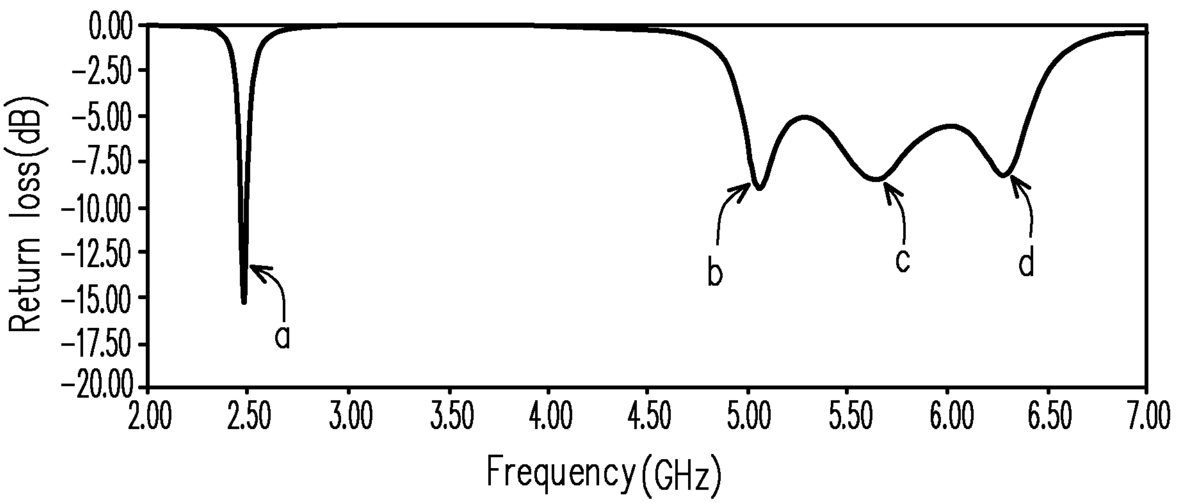
FIG. 9 is a return loss diagram of the cavity antenna module of FIG. 5.

FIG. 9 is a return loss diagram of the cavity antenna module of FIG. 5. Based on the above configuration of the cavity antenna module 130 of this embodiment, the metal cavity body 132 is capable of generating a first resonance frequency a (for example, about 2.4 GHz) and its multiple, a second resonance frequency b (for example, about 5 GHz), as shown in FIG. 9. In addition, the cavity antenna module 130 generates a higher third resonance frequency c and a fourth resonance frequency d respectively through the first antenna structure 134 and the second antenna structure 135.

In order for the metal cavity body 132 to generate the first resonance frequency a shown in FIG. 9 as described above, its size may be designed as follows. As shown in FIG. 5, the depth of the metal cavity body 132 in a Y direction is one sixteenth to one quarter of the wavelength corresponding to the first resonance frequency a, and the length L of the metal cavity body 132 in the X direction is one quarter to three quarters of the wavelength corresponding to the first resonance frequency a.

Figure 10:
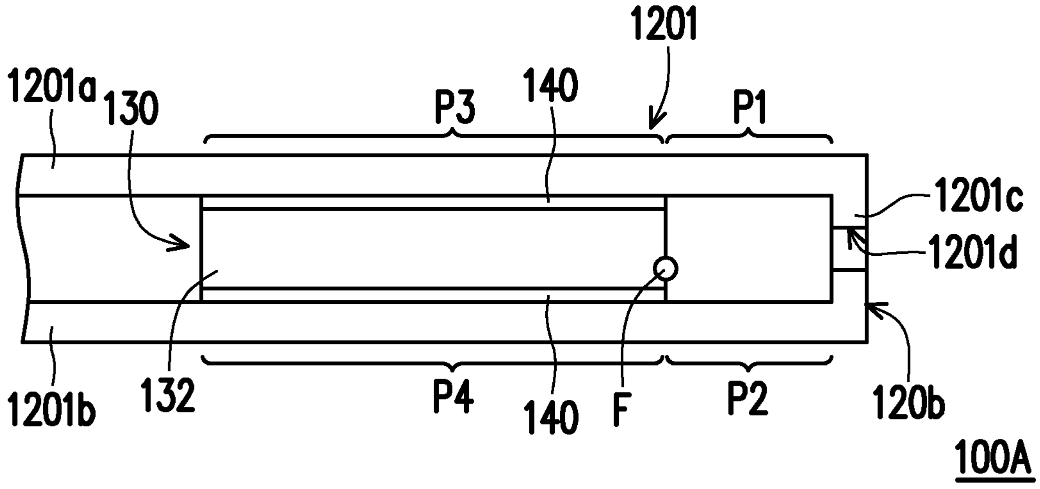
FIG. 10 is a schematic cross-sectional view of an electronic device according to yet another embodiment of the disclosure.

FIG. 10 is a schematic cross-sectional view of an electronic device according to another embodiment of the disclosure. The embodiment shown in FIG. 10 is different from the embodiment shown in FIG. 6 in that the metal cavity body 132 of FIG. 6 is directly connected to the metal casing 1201 for grounding, and that the electronic device 100A in FIG. 10 further includes at least one conductive bonding layer 140 (two are shown), and the metal cavity body 132 is connected to the metal casing 1201 through the conductive bonding layers 140 for grounding.

Figure 11:
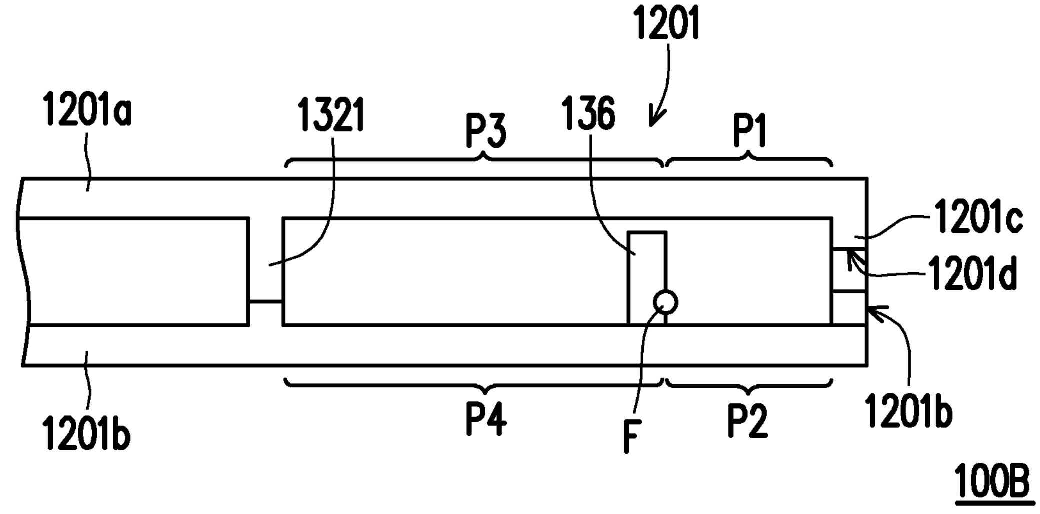
FIG. 11 is a schematic cross-sectional view of an electronic device according to still another embodiment of the disclosure.

FIG. 11 is a schematic cross-sectional view of an electronic device according to another embodiment of the disclosure. The embodiment shown in FIG. 11 is different from the embodiment shown in FIG. 6 in that the metal cavity body 132 in FIG. 11 is at least partially formed by a metal casing 1201. More specifically, in the electronic device 100B of FIG. 11, the top wall 1201*a* and the bottom wall 1201*b* of the metal casing 1201 constitute a part of the metal cavity body 132, and the wall 1321 of the metal cavity body 132 is connected between the top wall 1201*a* and the bottom wall 1201*b* of the metal casing 1201. The wall 1321 may be formed by the partially extending top wall 1201*a* and/or bottom wall 1201*b*.

Figure 12:
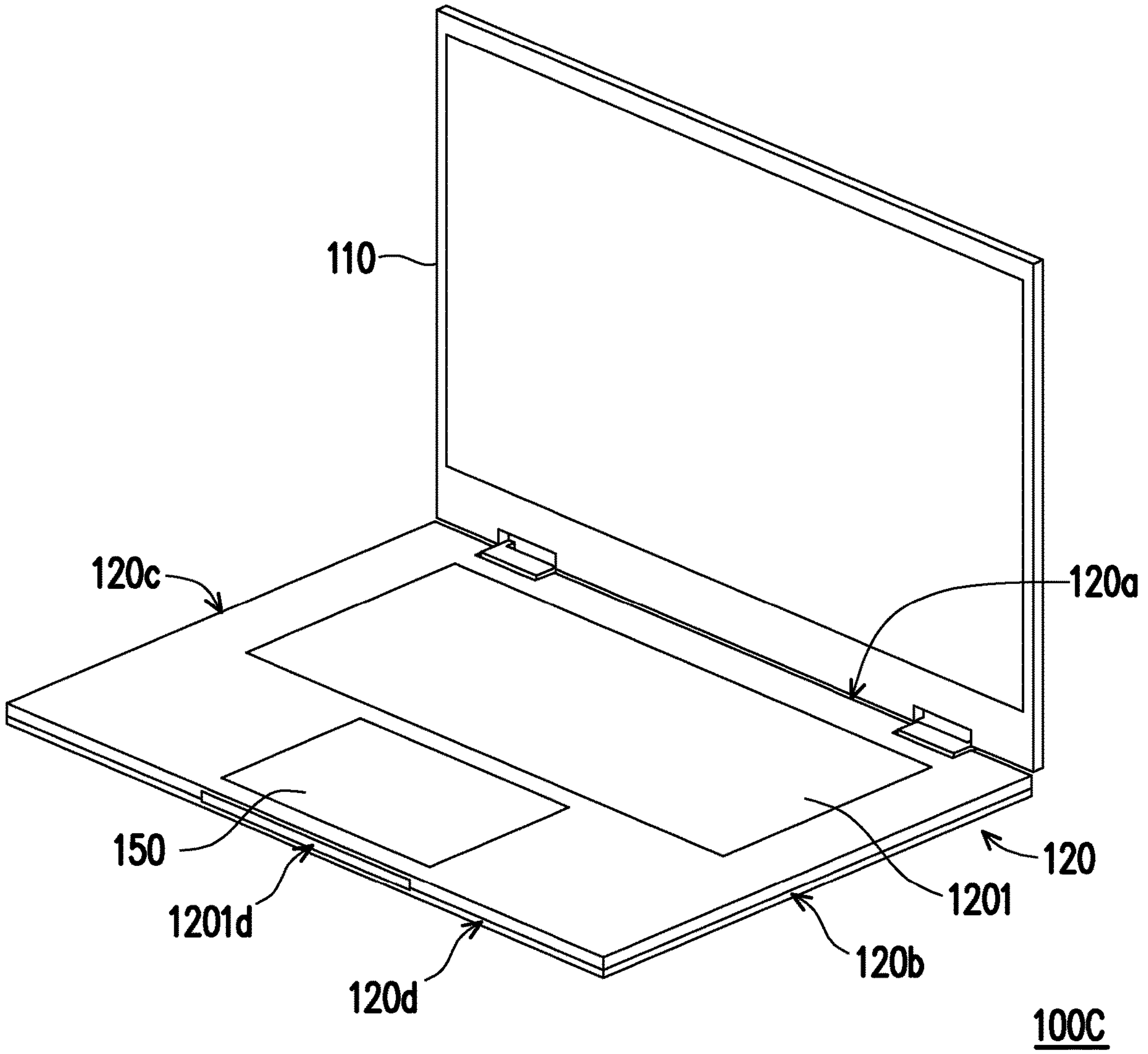
FIG. 12 is a perspective view of an electronic device according to still another embodiment of the disclosure.
Figure 13:
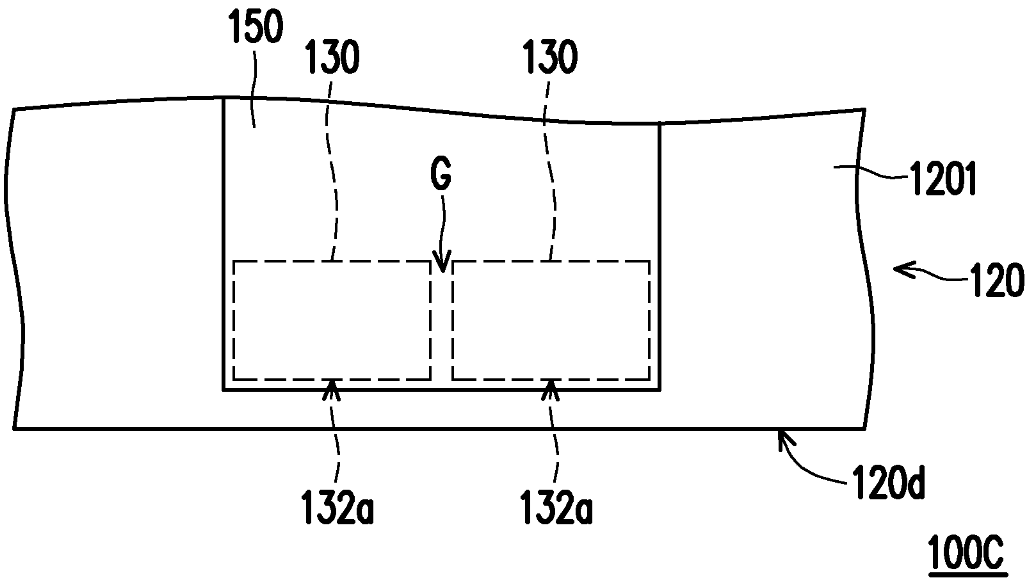
FIG. 13 is a partial top view of the electronic device of FIG. 12.
Figure 14:
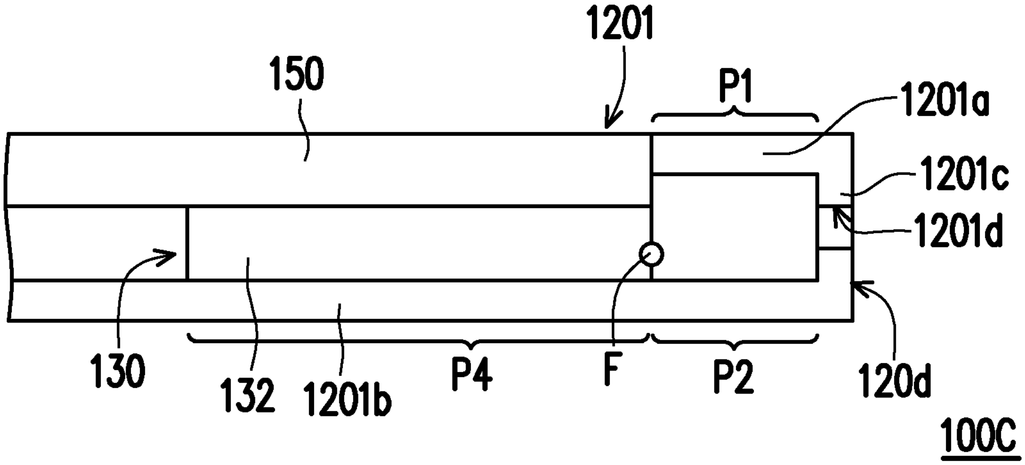
FIG. 14 is a schematic cross-sectional view of the electronic device of FIG. 12.

FIG. 12 is a perspective view of an electronic device according to another embodiment of the disclosure. FIG. 13 is a partial top view of the electronic device of FIG. 12. FIG. 14 is a schematic cross-sectional view of the electronic device of FIG. 12. The differences between the embodiment shown in FIG. 12 to FIG. 14 and the embodiment shown in FIG. 6 are that the electronic device 100C in FIG. 12 to FIG. 14 includes two cavity antenna modules 130, the opening 132*a* of the metal cavity body 132 of the cavity antenna module 130 faces the non-pivot side 120*d* of the second body 120, and the slot 1201*d* of the metal casing 1201 is located on the non-pivot side 120*d* of the second body 120. There is a gap G between the two cavity antenna modules 130, and the gap G is, for example, greater than or equal to 5 mm to prevent the two cavity antenna modules 130 from interfering with each other. In addition, the electronic device 100C of this embodiment includes a touchpad 150. The touchpad 150 is disposed on the top wall 1201*a* of the metal casing 1201 as shown in FIG. 12 to FIG. 14, and the metal cavity body 132 is located between the touchpad 150 and the bottom wall 1201*b* of the metal casing 1201. In other words, the touchpad 150 and the metal cavity body 132 are disposed above the bottom wall 1201*b* by overlapping each other.

Figure 15:
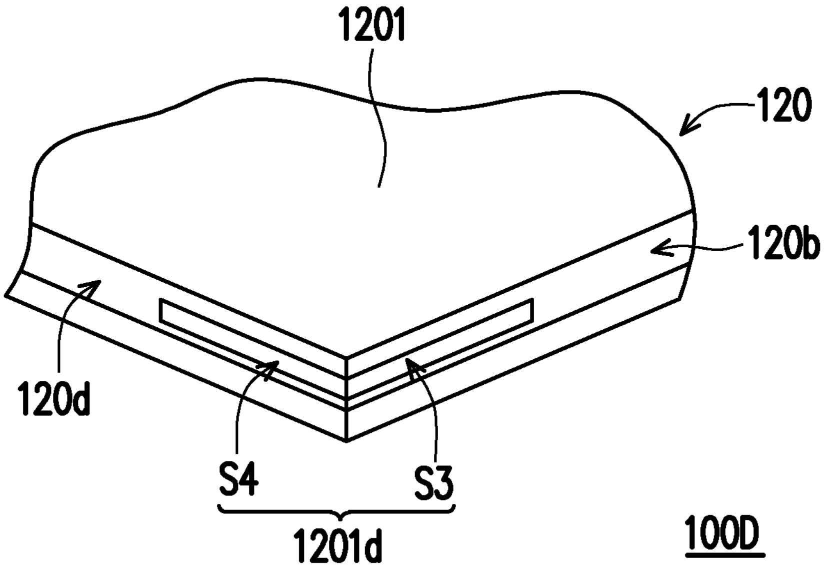
FIG. 15 is a partial perspective view of an electronic device according to yet another embodiment of the disclosure.
Figure 16:
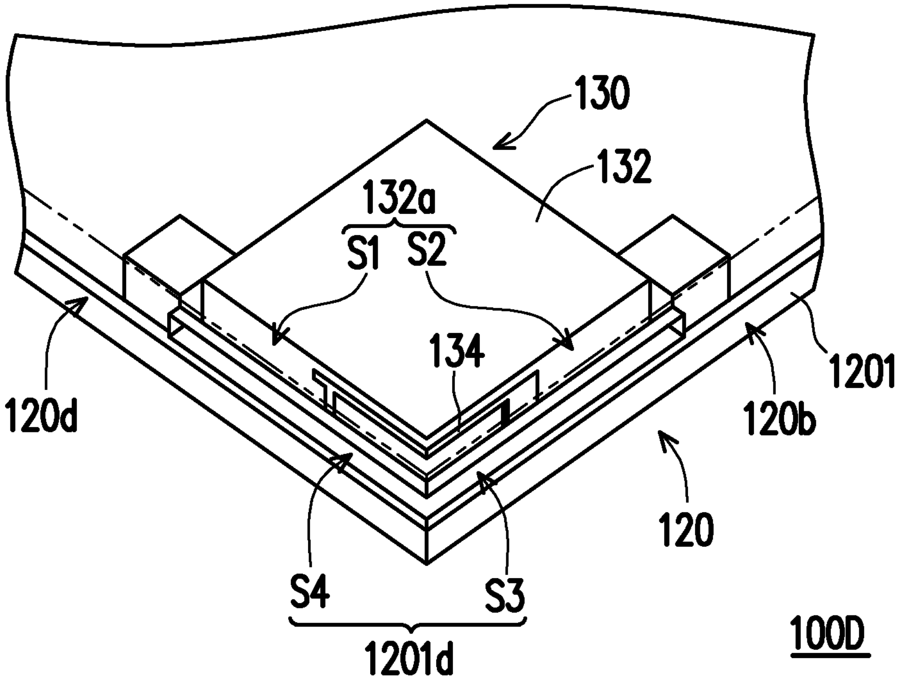
FIG. 16 is a partial perspective view of the electronic device of FIG. 15.
Figure 17:
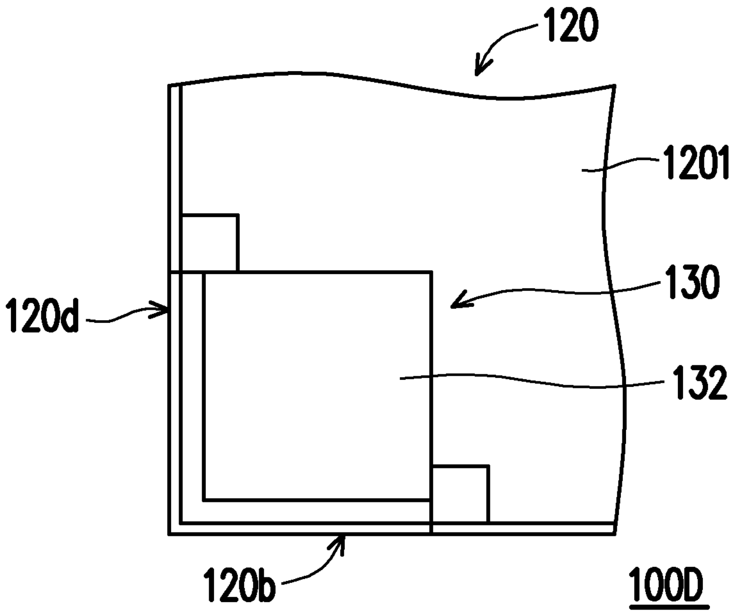
FIG. 17 is a top view of a partial structure of the electronic device of FIG. 15.

FIG. 15 is a partial perspective view of an electronic device according to still another embodiment of the disclosure. FIG. 16 is a partial perspective view of the electronic device of FIG. 15. FIG. 17 is a top view of a partial structure of the electronic device of FIG. 15. The difference between the embodiment shown in FIG. 15 to FIG. 17 and the embodiment shown in FIG. 6 is that the cavity antenna module 130 of the electronic device 100D of FIG. 15 to FIG. 17 is disposed at the corner of the metal casing 1201. Therefore, two sections S1 and S2 of the opening 132*a* of the metal cavity body 132 respectively face the two non-pivot sides 120*b* and 120*d* of the second body 120 that are adjacent to each other, and two sections S3 and S4 of the slot 1201*d* of the metal casing 1201 are respectively located on the two non-pivot sides 120*b* and 120*d* and respectively correspond to the two sections S1 and S2 of the opening 132*a*.

To sum up, in the present disclosure, a cavity antenna module is configured in the second body, where the opening of the metal cavity body faces a non-pivot side of the second body, so that the first antenna structure located in the opening is able to send and receive signals through the non-pivot side. Therefore, in the case where a casing of the second body is made of metal, it only needs to form a slot corresponding to the first antenna structure on the non-pivot side of the second body to operate the first antenna structure's signal transmission and reception and don't be interfered by the metal casing. Hence, the present disclosure provides a simple casing design for the cavity antenna module to have a good ability for receiving and transmitting signals without the need to provide a large antenna clearance area in the metal casing as in the conventional design.

What is claimed is:

1. An electronic device, comprising:
- a first body;
- a second body, having a pivot side and a plurality of non-pivot sides, the pivot side being connected pivotally to the first body; and
- at least one cavity antenna module, comprising:
  - a metal cavity body, disposed in the second body and having an opening, wherein a distance between one of the non-pivot sides and the metal cavity body is smaller than a distance between the pivot side and the metal cavity body, and the opening faces the one of the non-pivot sides; and
  - a first antenna structure, disposed in the opening and comprising a feeding portion, a radiating portion, and a ground portion connected with one another,
- wherein the second body comprises a metal casing, and the metal cavity body is disposed in the metal casing,
- wherein the metal casing comprises a top wall and a side wall connected to each other, the metal cavity body corresponds to a non-edge portion of the top wall, an edge portion of the top wall is connected between the side wall and the non-edge portion, and the metal casing has a slot, and the slot is formed on the side wall or the edge portion of the top wall,
- wherein two sections of the opening respectively face two adjacent ones of the non-pivot sides, and two sections of the slot are respectively located on the two ones of the non-pivot sides and respectively correspond to the two sections of the opening.

2. The electronic device according to claim 1, wherein the at least one cavity antenna module comprises an insulating substrate, the insulating substrate is embedded in the opening, and the first antenna structure is disposed on the insulating substrate.

3. The electronic device according to claim 1, comprising at least one conductive bonding layer, wherein the metal cavity body is connected to the metal casing through the at least one conductive bonding layer.

4. The electronic device according to claim 1, wherein the metal cavity body is at least partially constituted by the metal casing.

5. The electronic device according to claim 4, wherein the metal cavity body comprises at least one wall, and the at least one wall is connected between the top wall and the bottom wall.

6. The electronic device according to claim 1, wherein the at least one cavity antenna module comprises two cavity antenna modules, and a distance exists between the two cavity antenna modules.

7. The electronic device according to claim 6, wherein the distance is greater than or equal to 5 mm.

8. The electronic device according to claim 1, comprising a touchpad, wherein tje metal casing comprises a bottom wall, the top wall and the bottom wall are opposed to each other, the touchpad is disposed on the top wall, and the metal cavity body is located between the touchpad and the bottom wall.

9. The electronic device according to claim 1, wherein the at least one cavity antenna module comprises a second antenna structure, and the second antenna structure is disposed in the opening and coplanar with the first antenna structure.

* * * * *